US012715065B2

(12) United States Patent
Voronov et al.

(10) Patent No.: US 12,715,065 B2
(45) Date of Patent: Aug. 25, 2026

(54) LASER DEVICES INCLUDING BEAM POSITION CALIBRATOR AND METHOD FOR IRRADIATING LASER BY USING THE SAME

(71) Applicant: Samsung Display Co., Ltd., Yongin-Si (KR)

(72) Inventors: Alexander Voronov, Suwon-si (KR); Gyoo Wan Han, Yongin-si (KR); Woo Hyun Jung, Seoul (KR); Jung Hwa You, Hwaseong-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 478 days.

(21) Appl. No.: 17/340,832

(22) Filed: Jun. 7, 2021

(65) Prior Publication Data

US 2022/0088702 A1 Mar. 24, 2022

(30) Foreign Application Priority Data

Sep. 22, 2020 (KR) ........................ 10-2020-0122320

(51) Int. Cl.
*B23K 26/042* (2014.01)
*B23K 26/046* (2014.01)
(Continued)

(52) U.S. Cl.
CPC .......... *B23K 26/042* (2015.10); *B23K 26/046* (2013.01); *B23K 26/0648* (2013.01); *B23K 26/082* (2015.10)

(58) Field of Classification Search
CPC ................ B23K 26/042; B23K 26/046; B23K 26/0648; B23K 26/082; B23K 26/032;
(Continued)

(56) References Cited

U.S. PATENT DOCUMENTS 6,420,792 B1 * 7/2002 Guldi ................ H01L 21/67282 438/959
6,501,061 B1 12/2002 Kitai et al.
(Continued)

FOREIGN PATENT DOCUMENTS

EP 1666185 B1 9/2008
JP 2015-006674 A 1/2015
(Continued)

OTHER PUBLICATIONS

Rottenfusser, Rudi, in Methods in Cell Biology, 2013, Section 3.1.1.5 as it appears on https://www.sciencedirect.com/topics/neuroscience/numerical-aperture#:~:text=It%20can%20never%20get%20any,air%20has%20to%20be%20applied. (Year: 2013).*

*Primary Examiner* — Ibrahime A Abraham
*Assistant Examiner* — Kristina B Burns
(74) *Attorney, Agent, or Firm* — Innovation Counsel LLP

(57) ABSTRACT

Provided is a laser device. The laser device according to an embodiment includes a laser source that provides a laser beam to a process object, a laser deflector that deflects the laser beam supplied from the laser source, an object lens that focuses scattered light of the laser beam that has been incident on the process object and then scattered, an image capture device that captures an image of the scattered light focused in the object lens, and a corrector that corrects a position of the laser beam by using the captured image.

20 Claims, 14 Drawing Sheets

(51) Int. Cl.
*B23K 26/064* (2014.01)
*B23K 26/082* (2014.01)

(58) Field of Classification Search
CPC .. B23K 26/043; B23K 26/705; B23K 26/062; G01J 1/4257
See application file for complete search history.

(56) References Cited

U.S. PATENT DOCUMENTS 9,430,685 B2 * 8/2016 Voronov .................. B41J 2/442
11,548,046 B2 * 1/2023 Latouche ................ B21C 51/00
2006/0102608 A1 * 5/2006 Katsuta .............. B23K 26/0853 219/121.83
2010/0292947 A1 11/2010 Buk
2013/0186871 A1 7/2013 Suzuki et al.
2016/0147214 A1 * 5/2016 Lu .......................... B23K 26/04 700/166
2018/0147658 A1 * 5/2018 Shapiro .............. B23K 26/0853
2018/0186082 A1 * 7/2018 Randhawa ............. B33Y 50/02
2019/0143458 A1 5/2019 Strebel
2020/0114473 A1 * 4/2020 Hyakumura ....... B23K 26/0673
2020/0269359 A1 * 8/2020 Tanaka ................. B23K 26/082

FOREIGN PATENT DOCUMENTS

JP 2015196169 * 11/2015
KR 10-2006-0052609 A 5/2006
KR 100771496 * 10/2007
KR 10-2013-0071466 A 6/2013
KR 10-1511645 B1 4/2015
KR 10-2017-0127168 A 11/2017
KR 10-1890358 B1 8/2018
KR 10-2020-0081493 A 7/2020
WO WO-2020090962 A1 * 5/2020 ............. B23K 26/03

* cited by examiner

LASER DEVICES INCLUDING BEAM POSITION CALIBRATOR AND METHOD FOR IRRADIATING LASER BY USING THE SAME

CROSS-REFERENCE TO RELATED APPLICATION

This application claims priority to and the benefit of Korean Patent Application No. 10-2020-0122320 filed in the Korean Intellectual Property Office on Sep. 22, 2020, the entire contents of which are incorporated herein by reference.

BACKGROUND

1. Field

The present disclosure generally relates to a laser device including a beam position calibrator, and a method for irradiating a laser by using the same. More particularly, the present disclosure relates to a laser device including a beam corrector which can increase accuracy of a laser irradiation position.

2. Description of the Related Art

In general, when a process is carried out by using a laser device, an alignment mark is located on a front side of an object to which the laser is irradiated, and a position of the laser beam of the laser device is corrected by using the alignment mark position on the front side.

There are various disclosures on a method of correcting a laser beam of such a laser device.

U.S. Pat. No. 6,501,061 discloses a method for determining scanner coordinates in order to accurately dispose a focused laser beam. The focused laser beam is scanned over an area of interest, for example, an opening of the working surface of a laser scanner. The position of the focused laser beam is detected at a predetermined time interval or a space by a photo detector, or when the focused laser beam passes through the opening of the work surface. The detected position of the focused laser beam is used to generate an actual beam position relationship with a data based scanner position. The data on the relationship of the actual beam position to the scanner position may be used to determine whether the focused laser beam is positioned at the center of the opening corresponding to a desired position or to determine exact position coordinates of the beam.

U.S. Patent Publication US2010/0292947 discloses a method of performing a scan head calibration process with the help of a guide mark. A calibration mark is formed on an object with a laser, the calibration mark is captured with a camera, and a position error between the guide mark and the calibration mark is measured and corrected. In this method, the object is damaged to form a calibration mark using a laser during calibration operation, and calibration is possible only when the calibration mark and guide mark are positioned on the same plane.

European patent EP 1666185 relates to a laser processing machine and method having an image acquisition and processing means, and according to this patent, the laser calibration process can be performed using an object's pattern, for example, a microchip circuit pattern, or a display pixel structure, without using a calibration substrate with a special alignment mark. However, this is also difficult to apply when the process is performed using a laser on the side of the object rather than the front surface where the pattern of the object itself is formed.

The above information disclosed in this Background section is only for enhancement of understanding of the background of the described technology, and therefore it may contain information that does not form the prior art that is already known in this country to a person of ordinary skill in the art.

SUMMARY

Embodiments have made an effort to provide a laser device including a beam corrector which can increase accuracy of a laser irradiation position even when an alignment mark is positioned on a different surface from a surface where a process is performed by performing the process using a laser on a surface different from the surface where the alignment mark is positioned, and a laser irradiation method using the same.

It is obvious that the object of the embodiments is not limited to the above-described object, and can be variously extended in a range that does not deviate from the spirit and region of the embodiments.

A laser device according to an embodiment includes: a laser source that provides a laser beam to a process object; a laser deflector that deflects the laser beam supplied from the laser source; an object lens that focuses scattered light of the laser beam that has been incident on the process object and then scattered; an image capture device that captures an image of the scattered light focused in the object lens; and a corrector that corrects a position of the laser beam by using the captured image.

The corrector may include a memory and a calculator.

The process object may a first side and a second side that are perpendicular to each other, the process object comprises a plurality of alignment marks disposed on the first side, and the laser beam is irradiated to the second side of the process object.

The area of the second side may be larger than the area of the first side, and the plurality of alignment marks may be a plurality of pixels formed in the first side.

The object lens may be disposed to face the second side.

The object lens may have a numerical aperture that is smaller than 1.

The object lens may have a numerical aperture of 0.65.

The image capture device may be disposed to face the first side.

The image capture device may capture an image of the plurality of alignment marks.

A laser irradiation method according to an embodiment includes: supplying a laser beam having first intensity to a process object; irradiating the laser beam to a plurality of positions of the surface of the process object by scanning the supplied laser beam; capturing a first image of scattered light of the laser beam incident on the surface of the process object and then scattered, and a second image of alignment marks of the process object; calculating a position error of the laser beam by using the captured first image and second image; and correcting the calculated position error.

The laser irradiation method may further include focusing the scattered light of the laser beam by using an object lens.

The capturing of the image may capture the first image of the focused scattered light.

The calculating the position error of the laser beam may include first error calculating for calculating a position difference between the captured first image and second image.

The first error calculating may be calculating an error of the laser beam in a first direction or an error of the laser beam in a second direction that is perpendicular to the first direction.

The calculating the position error of the laser beam may further include second error calculating for determining a position difference by comparing the captured first image and a reference image stored in a corrector.

The second error calculating may be calculating an error of the laser beam in a third direction that is perpendicular to the first direction and the second direction.

The correcting may include controlling a position of the laser beam.

The controlling the position of the laser beam may use a laser scanner.

The laser irradiation method may further include supplying a laser beam having second intensity to the process object after the correcting, wherein the second intensity may be higher than the first intensity.

The first intensity of the laser beam may be 0.01 J/cm$^2$ to 0.1 J/cm$^2$, and the second intensity of the laser beam may be 1 J/cm$^2$ or more.

According to the laser device including the beam calibrator, and the laser irradiation method using the same according to the embodiments, even when the alignment mark is disposed on a surface different from the surface on which the process is performed, the accuracy of the position at which the laser is irradiated increases, and accordingly, the accuracy of the laser irradiation process can be increased.

It is apparent that the effect of the embodiments is not limited to the above-described effect, and can be variously extended in a range not departing from the spirit and region of the embodiments.

DETAILED DESCRIPTION

Figure 1:
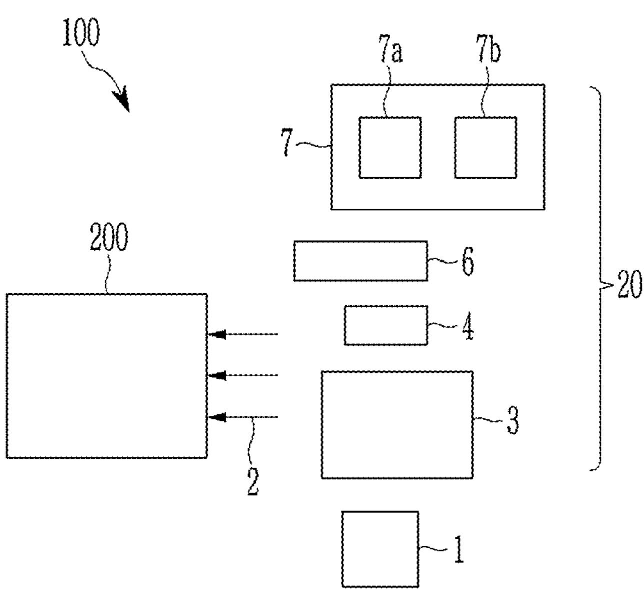
FIG. 1 is a block diagram of a laser device according to an embodiment.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

In the drawings, size and thickness of each element are arbitrarily illustrated for convenience of description, and the present invention is not necessarily limited to as illustrated in the drawings. In the drawings, the thickness of layers, films, panels, regions, etc., are exaggerated for clarity. In addition, in the drawings, for better understanding and ease of description, the thicknesses of some layers and regions are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, throughout the specification, the word "on" a target element will be understood to be positioned above or below the target element, and will not necessarily be understood to be positioned "at an upper side" based on an opposite to gravity direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

Throughout the specification, "connected" does not mean only when two or more constituent elements are directly connected, but also when two or more constituent elements are indirectly connected through another constituent element, or when physically connected or electrically connected, and it may include a case in which substantially integral parts are connected to each other although they are referred to by different names according to positions or functions.

Figure 2:
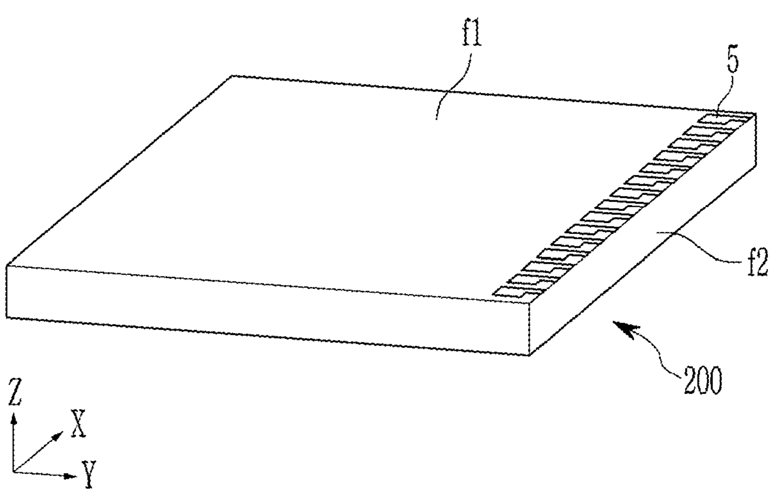
FIG. 2 shows a process object according to the embodiment.
Figure 3:
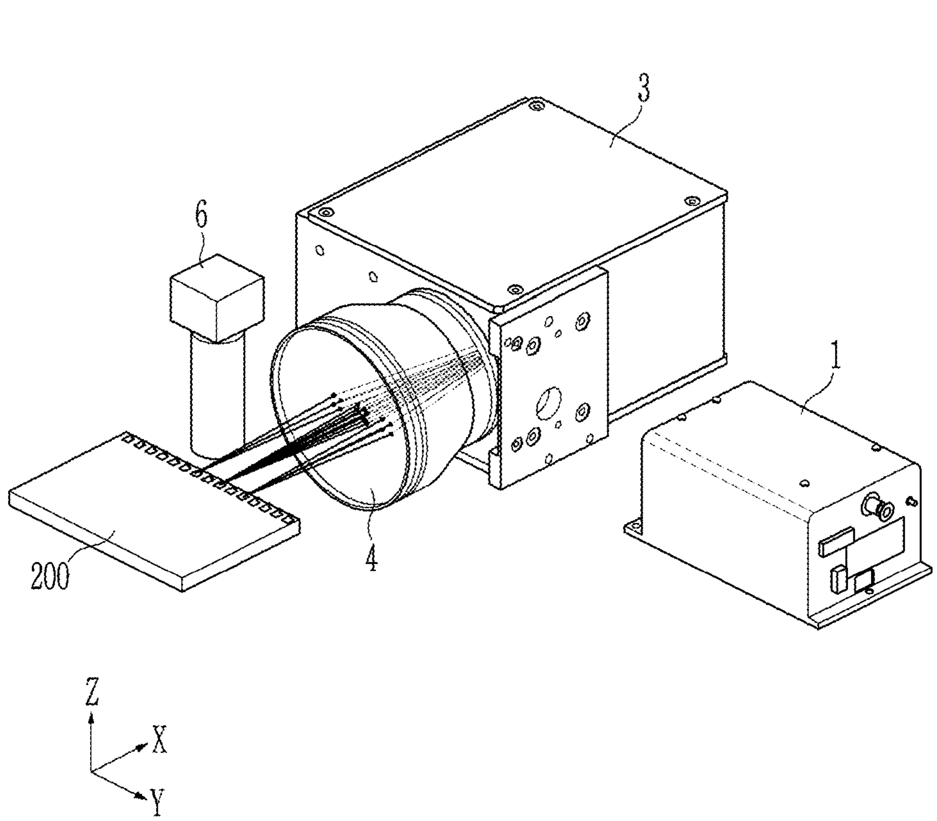
FIG. 3 is a schematic view of the laser device according to the embodiment.

Referring to FIG. 1, FIG. 2, and FIG. 3, a laser device 100 according to an embodiment will be described. FIG. 1 is a block diagram of a laser device 100 according to an embodiment, FIG. 2 shows a process object according to the embodiment, and FIG. 3 is a schematic view of the laser device 100 according to the embodiment.

Referring to FIG. 1, a laser beam 100 according to an embodiment includes a laser source 1 that provides a laser beam 2 to a process object 200, and a beam calibrator 20 that calibrates the laser beam. The beam calibrator 20 includes a laser deflector 3, an object lens 4, an image capture device 6, and a corrector 7. The corrector 7 includes a memory 7*a* and a calculator 7*b*.

Referring to FIG. 2, the process object 200 will be described. The process object 200 includes a first surface f1 and a second surface f2 which is perpendicular to the first side. The first surface f1 is a plane formed by crossing a first direction x and a second direction y, and may be atop surface or a bottom surface of the process object 200. The second surface f2 is a plane formed by crossing the second direction y and a third direction z that is perpendicular to the first direction x and the second direction y, and may be a side surface of the process object 200. In this example, the area of the first surface f1 may be larger than the area of the second surface f2. The process object 200 includes a plurality of alignment marks 5 that are formed in the first surface f1. The plurality of alignment marks 5 may be a plurality of pixels formed in the first surface f1.

A process that uses laser beams may be carried out on the second surface f2 rather than on the first surface f1 where the plurality of alignment marks 5 are formed. For example, the process object 200 may be a substrate where a plurality of pixels are formed, and the plurality of pixels may be formed in the first surface f1. In order to form a display device which contains a large area, a plurality of substrates on which a plurality of pixels are formed may be connected to each other to create a large display device, and in this case, a signal line must be formed for signal transmission on a side surface where the substrates are connected to each other, that is, in the second surface f2.

As described, when a laser irradiation process for forming the signal line on the side surface f2 of the process object 200 is carried out, it needs to be determined whether the laser is accurately irradiated to an intended position to thereby calibrate the laser irradiation portion. However, since the alignment marks 5 are not located in the second surface f2 where the process is carried out, it is difficult to perform a general calibration method.

Now, referring to FIG. 3 together with FIG. 1, a beam calibrator 20 for calibrating laser beams irradiated to a side surface of the process object 200 of the laser device according to the embodiment, that is, the second surface f2 where the alignment marks 5 are not disposed, will be described.

As previously described, the beam calibrator 20 includes a laser deflector 3, an object lens 4, an image capture device 6, and a corrector 7.

The laser source 1 supplies laser beams having desired intensity for a desired time period, and the laser deflector 3 deflects the laser beam supplied from the laser source 1 and irradiates the deflected laser beam in a direction perpendicular to the second surface f2 of the process object 200.

The object lens 4 is disposed at a position that faces the second surface f2 of the process object 200, and focuses scattered light that is scattered at the second surface f2 of the process object 200.

The image capture device 6 captures a first image E1 (not shown) formed by the scattered light that is scattered at the second surface f2 by using light focused by the object lens 4, and captures a second image E2 (not shown) of the alignment marks 5 formed in the first surface f1 of the process object 200.

The calculator 7*b* of the corrector 7 determines whether the first image E1 and the second image E2 match each other by using the first image E1 and the second image E2 captured by the image capture device 6 to calculate an error in the second direction y, and calculates an error in the third direction z by comparing data stored in the memory 7*a*. As described, the position to be irradiated with the laser beam is moved to calibrate the error of the calculated second direction y and the third direction z.

Next, a first operation of the beam calibrator 20 of the laser device 100 according to the embodiment will be described with reference to FIGS. 4, 5, 6, 7, and 8, together with FIGS. 1, 2, and 3.

Figure 4:
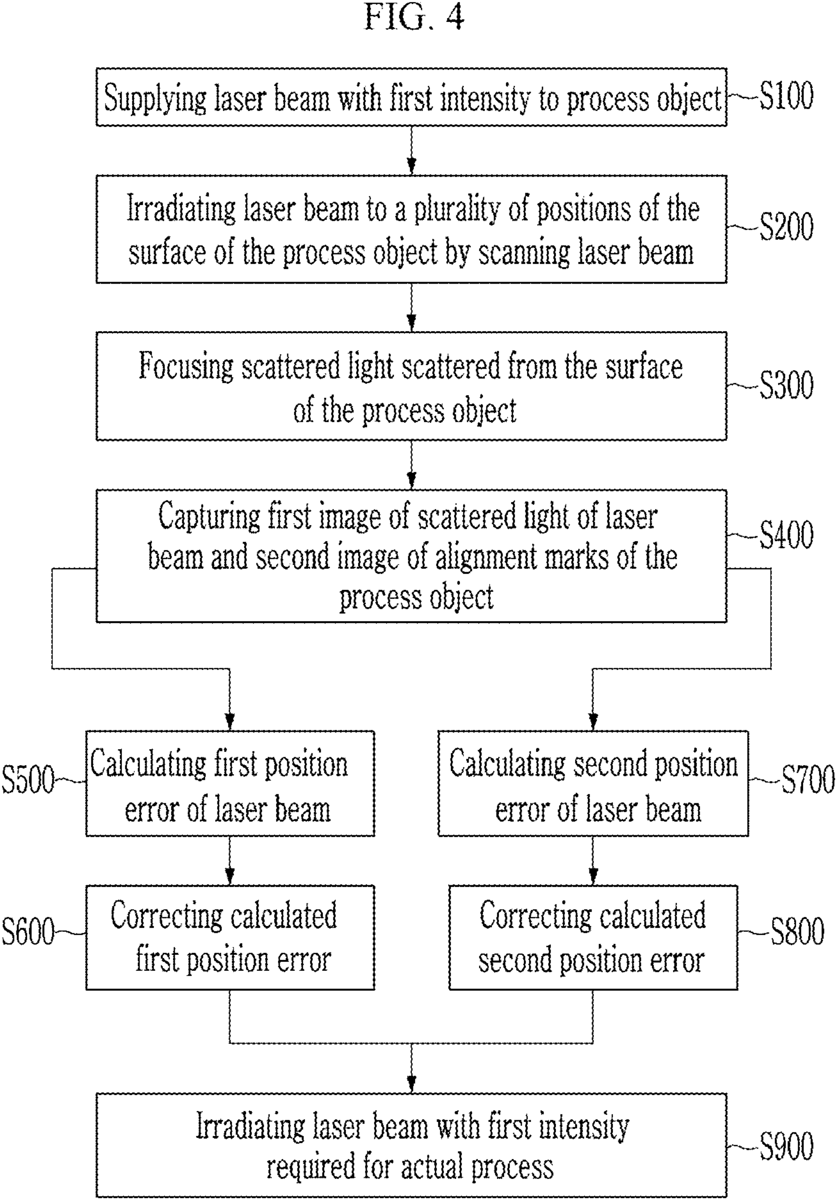
FIG. 4 is a flowchart that sequentially shows a laser irradiation method of the laser device according to the embodiment.
Figure 5:
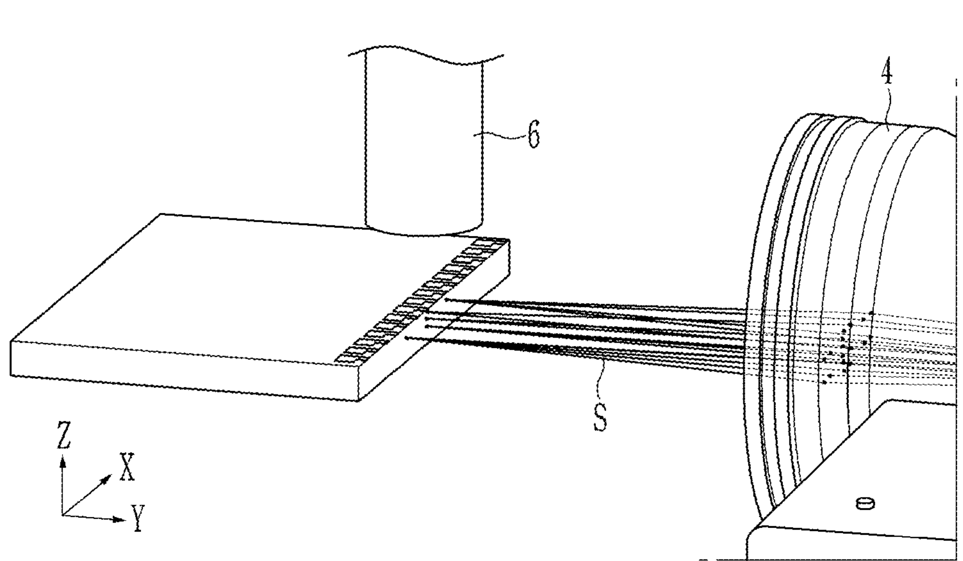
FIG. 5 and FIG. 6 are enlarged views of a part of FIG. 3.
Figure 6:
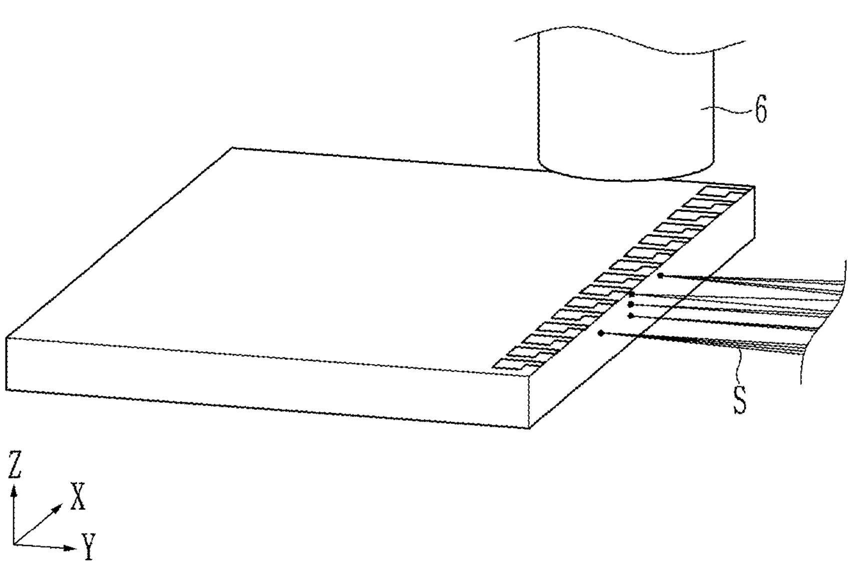
Figure 7A:
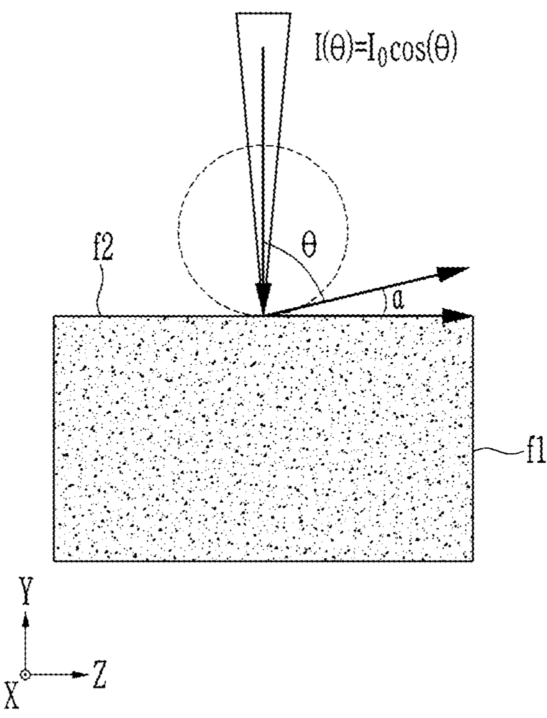
FIG. 7A and FIG. 7B are provided for description of operation of the object lens according to the embodiment.
Figure 7B:
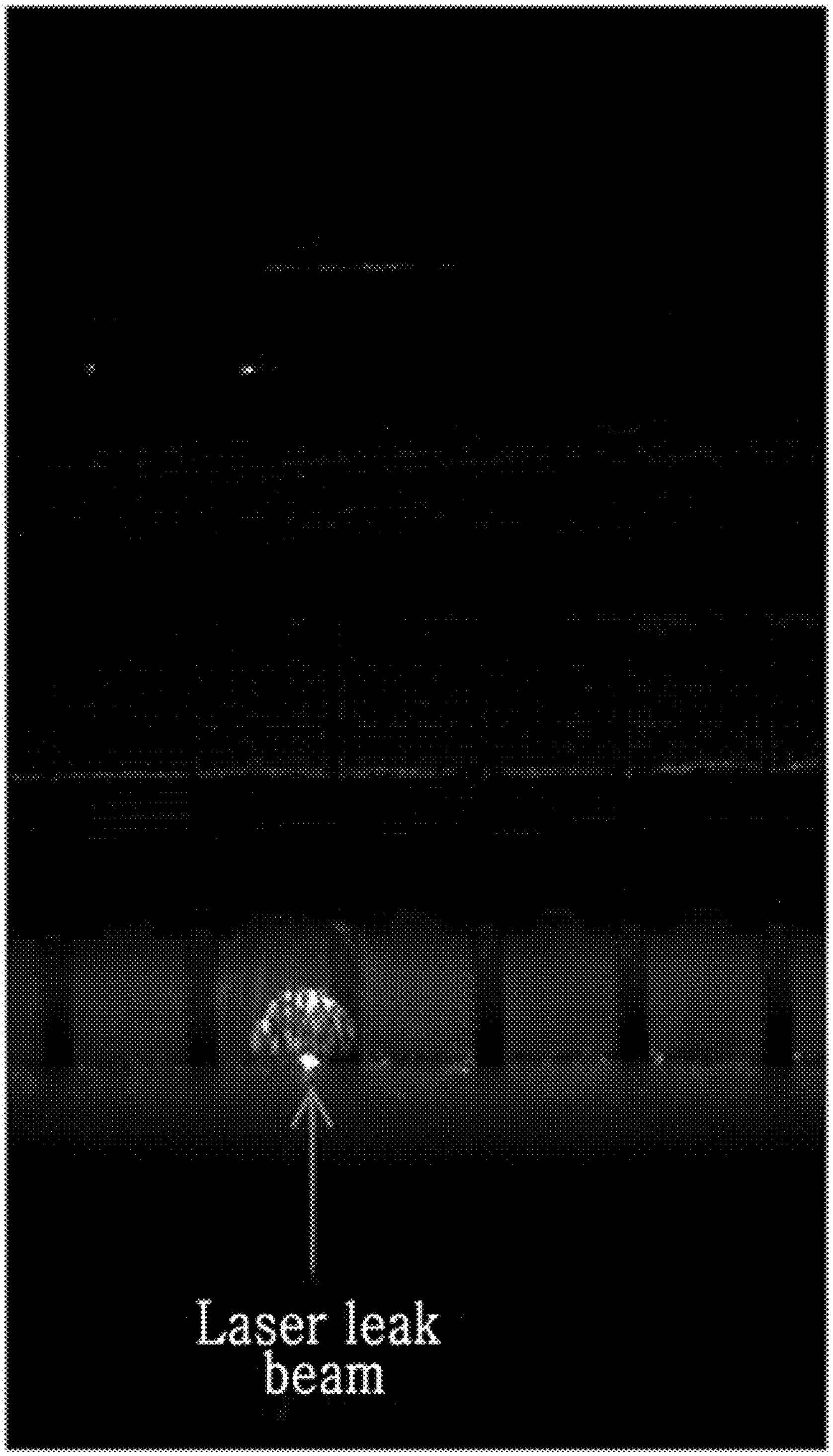
Figure 8:
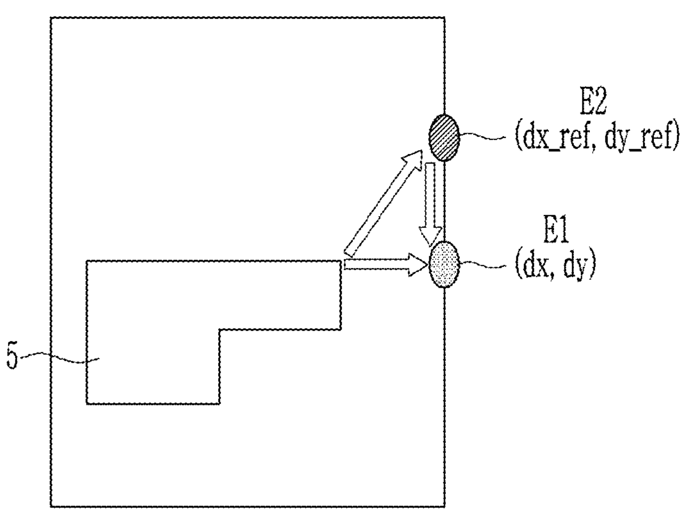
FIG. 8 shows the first operation of the beam calibrator of the laser device according to the embodiment.
Figure 9:
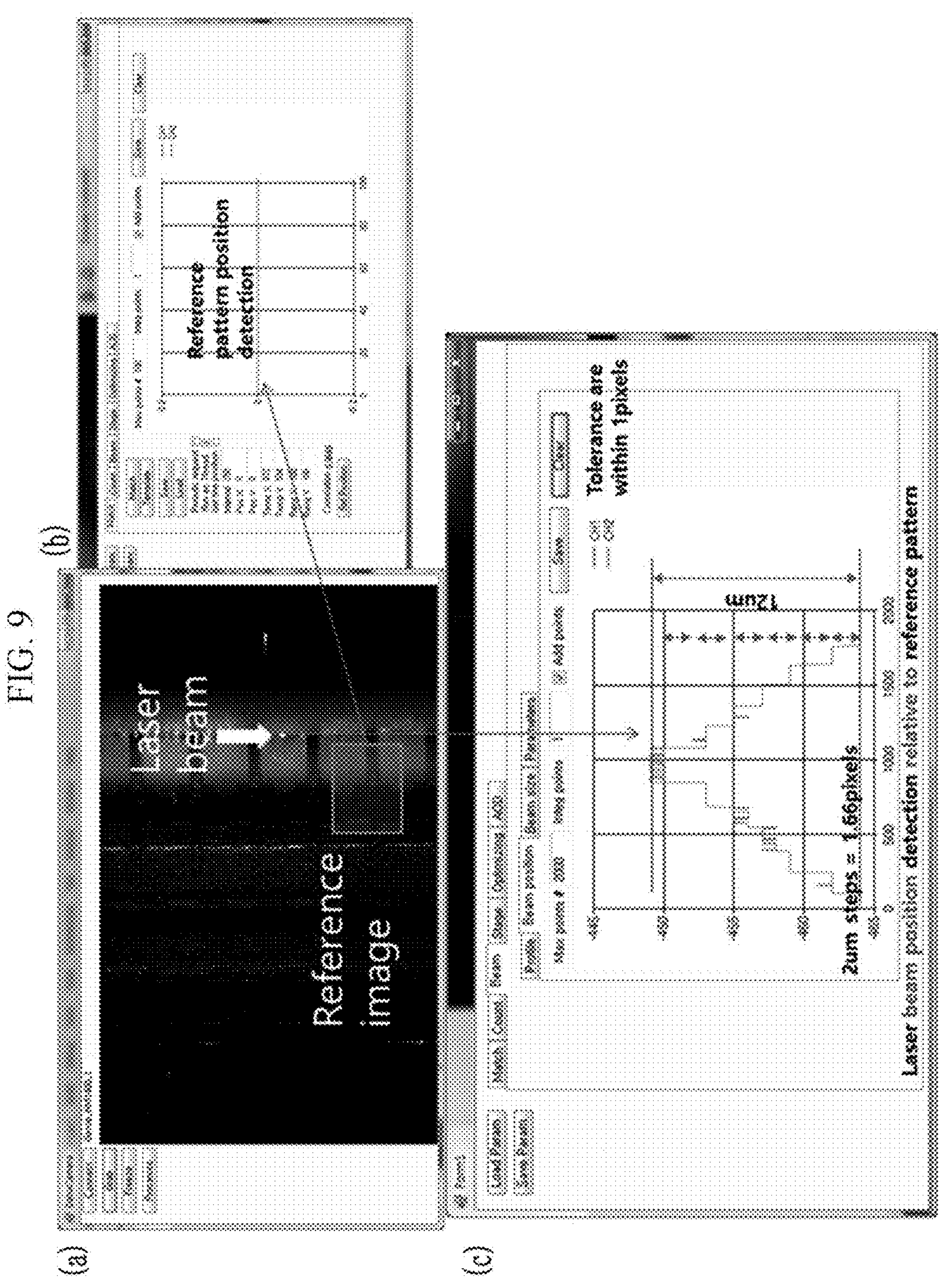
FIG. 9 shows an example of a result of an image and an example of an image measurer according to the embodiment.

FIG. 4 is a flowchart that sequentially shows a laser irradiation method of the laser device according to the embodiment. FIG. 5 and FIG. 6 are enlarged views of a part of FIG. 3, FIG. 7A and FIG. 7B are provided for description of operation of the object lens according to the embodiment, FIG. 8 shows the first operation of the beam calibrator of the laser device according to the embodiment, and FIG. 9 shows an example of a result of an image and an example of an image measurer according to the embodiment.

Referring to FIG. 3 and FIG. 4, as previously described, the laser irradiation method according to the embodiment includes a step of supplying a laser beam having first intensity to the process object 200 by using the laser source 1 (S100). The first intensity of the laser beam may be less than the intensity of the laser beam used in an actual process. For example, the first intensity of the laser beam may be less than or equal to 0.1 J/cm2. As described above, in the laser irradiation method, the laser beam of a relatively weak first intensity is irradiated during the beam calibration operation of the beam calibrator 20 such that the beam calibration operation can be carried out without damaging the process object 200.

Next, the laser irradiation method according to the embodiment includes a step of irradiating the laser beam while scanning in a direction that is parallel with the second direction y and the third direction z while being perpendicular to the second surface f2 of the process object 200 by deflecting the laser beam supplied from the laser source 1 using the laser deflector 3 (S200).

Next, as shown in FIG. 5, the laser irradiation method according to the embodiment includes a step of focusing the scattered light S that is scattered from the second surface f2 of the process object 200 by using the object lens 4 (S300), and as shown in FIG. 6, a step of capturing the first image E1 by the scattered light that is scattered from the second surface f2 by using light focused by the process object 200 and capturing the second image E2 of the alignment marks 5 formed in the first surface f1 of the process object 200 by using the capture device 6 (S400). In the capturing of the first image E1 and the second image E2 (S400), the first image E1 and the second image E2 may be captured in one frame.

This will be described in detail with reference to FIG. 7A and FIG. 7B together with FIG. 5 and FIG. 6.

As previously described, in the capturing the image (S400), not only the second image E2 of the plurality of alignment marks 5 formed in the first surface f1 of the process object 200, but also the first image E1 according to the laser beam irradiated perpendicularly to the second surface f2 of the process object 200 can be captured.

That is, the image capture device 6 simultaneously captures the second image E2 of the plurality of alignment marks 5 disposed in the first surface f1 of the process object 200 and the first image E1 by the scattered light that is scattered from the second surface f2 that is perpendicular to the first surface f1 of the process object 200. In this case, the image capture device 6 can capture the first image E1 and the second image E2 in one frame.

As shown in FIG. 5 and FIG. 6, since the image capture device 6 is positioned on the first surface f1 of the process object 200, the second image E2 of the plurality of alignment marks 5 disposed in the first surface f1 of the process object 200 can be captured. However, it is difficult to directly capture the scattered light that is scattered from the second surface f2 of the process object 200, and thus it is captured through the step of focusing (S300) of the scattered light that is scattered from the second surface f2 of the process object 200 by using the object lens 4.

As shown in FIG. 5, the object lens 4 may be disposed at a position facing the second surface f2 of the process object 200 to which the laser beam is irradiated. The laser beam irradiated to the second surface f2 of the process object 200 is scattered at the second surface f2, the scattered light can be focused in the object lens 4, and the first image E1 by the laser beam focused in the object lens 4 is captured by the image capture device 6.

Referring to FIG. 7A, the amount of scattered light that is scattered at the second surface f2 of the process object 200 can be estimated by Lambert's cosine law as shown in Equation 1.

$$I(\theta)=I_0\cos(\theta)$$ <Equation 1>

In addition, the amount of scattered light sensed by an image sensor of an imaging system that includes the object lens 4 is changed according to a numerical aperture (NA) of the object lens 4 and is calculated as given in Equation 2.

$$NA=\tan(\alpha)$$ <Equation 2>

For example, the amount of scattered light incident on the image sensor through an object lens having a numerical aperture NA can be calculated by Equation 3.

<Equation 3>

$$I_{camera} = I_0\int_{\pi-x}^{\pi}\int_{-x}^{x}\cos(\theta)d\theta d\phi = I_0 2\tan^{-1}(NA)\left(1-\frac{1}{\sqrt{1+NA^2}}\right)$$

Here, φ is an azimuth angle for the incident laser beam direction. When the numerical aperture NA of the objection lens of the image system is not too high (e.g., when the numerical aperture NA is smaller than 1, NA<<1), the intensity of the scattered light incident on the image sensor can be calculated as shown in Equation 4.

$$I_{camera}\approx I_0 NA^3$$ <Equation 4>

As shown in Equation 4, in order to sense a large amount of scattered light at the second surface f2, which is the side surface of the process object 200, it is desirable to have a numerical aperture NA that is smaller than 1 while being as large as possible. For example, it is preferable that the numerical aperture is larger than about 0.1.

FIG. 7B shows an example of an image captured by the image sensor when the numerical aperture of the object lens 4 is 0.65. FIG. 7B shows an image where laser beams are irradiated to an area of about 8 μm with laser power of about 10 mW and a laser pulse of about 1 MHz. This corresponds to energy density of about 0.02 J/cm$^2$.

In FIG. 7B, the bright spot at the center corresponds to the position of the laser beam irradiating on the side of the process object 200.

As described, it is possible to capture an image by the scattered light due to scattering of the laser beam irradiated to the side surface of the process object 200 by using the object lens 4 of which a numerical aperture is greater than about 0.1.

As previously described, the first image E1 (not shown) formed by the scattered light scattered from the second surface f2 that is perpendicular to the first surface f1 of the process object 200 by using light focused by the process object 200 by using the image capture device 6, and the second image E2 (not shown) of the plurality of alignment marks 5 that are located in the first surface f1 of the process object 200. In this case, the first image E1 and the second image E2 may be captured in one frame by the image capture device 6.

After the step of capturing the first image and the second image (S400), the laser irradiation method according to the embodiment includes a step of calculating an error in a horizontal direction, that is, the first direction x and the second direction y using the first image E1 and the second image E2 with the corrector 7 (S500) as shown in FIG. 8.

The calculator 7*b* of the corrector 7 calculates a difference dx_correction and dy_correction between positions dx and dx according to the first image E1 and positions dx_ref and dy_ref according to the second image E2 by using the first image E1 and the second image E2 captured by the image capture device 6. The position difference values are calculated as given in Equation 5a and Equation 5b.

$$dx\_correction=dx\_ref-dx$$ <Equation 5a>

$$dy\_correction=dy\_ref-dy$$ <Equation 5b>

As described, the laser irradiation method according to the embodiment includes first correcting (S600) for correcting laser beam irradiation portions in the first direction x and the second direction y by using the calculated position different values dx_correction and dy_correction.

Next, referring to FIG. 9, a program interface of the corrector 7 used in the first correcting (S600) will be described.

In FIG. 9, the first interface (a) illustrates example of a first image E1 (laser beam) and a second image E2 (reference image).

In FIG. 9, the second interface (b) displays a center of one alignment mark 5 in a constant area (the area marked by a quadrangle in (a)) as zero with reference to one of the plurality of alignment marks.

In FIG. 9, the third interface (c) is a graph that shows intensity of a laser beam in a graph by using the first image E1 of the laser beam detected according to positions, while moving the position of the laser beam by about 2 μm with respect to one alignment mark 5.

Referring to FIG. 9, the intensity of the laser beam changes within a range of about 1 μm or less, and the part with the greatest intensity of the laser beam is the position to which the laser beam is irradiated, and accordingly, the position of the laser beam can be adjusted to the center of the alignment mark 5. Accordingly, it is possible to correct the position of the laser beam with a range of 1 μm or less.

Figure 10:
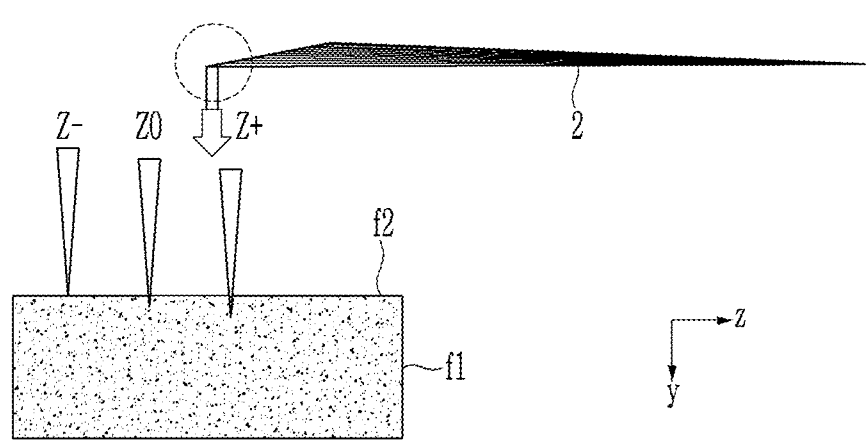
FIG. 10 shows the second operation of the beam calibrator of the laser device according to the embodiment.
Figure 11:
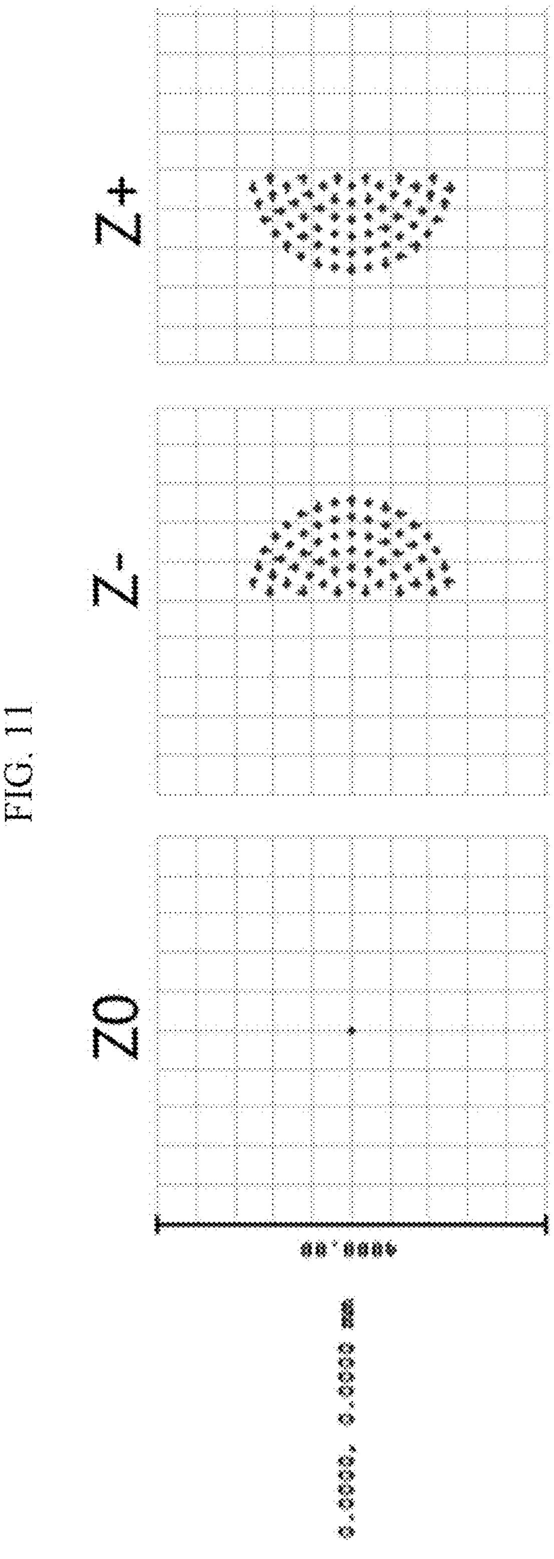
FIG. 11 shows an example of an image according to the embodiment.
Figure 12:
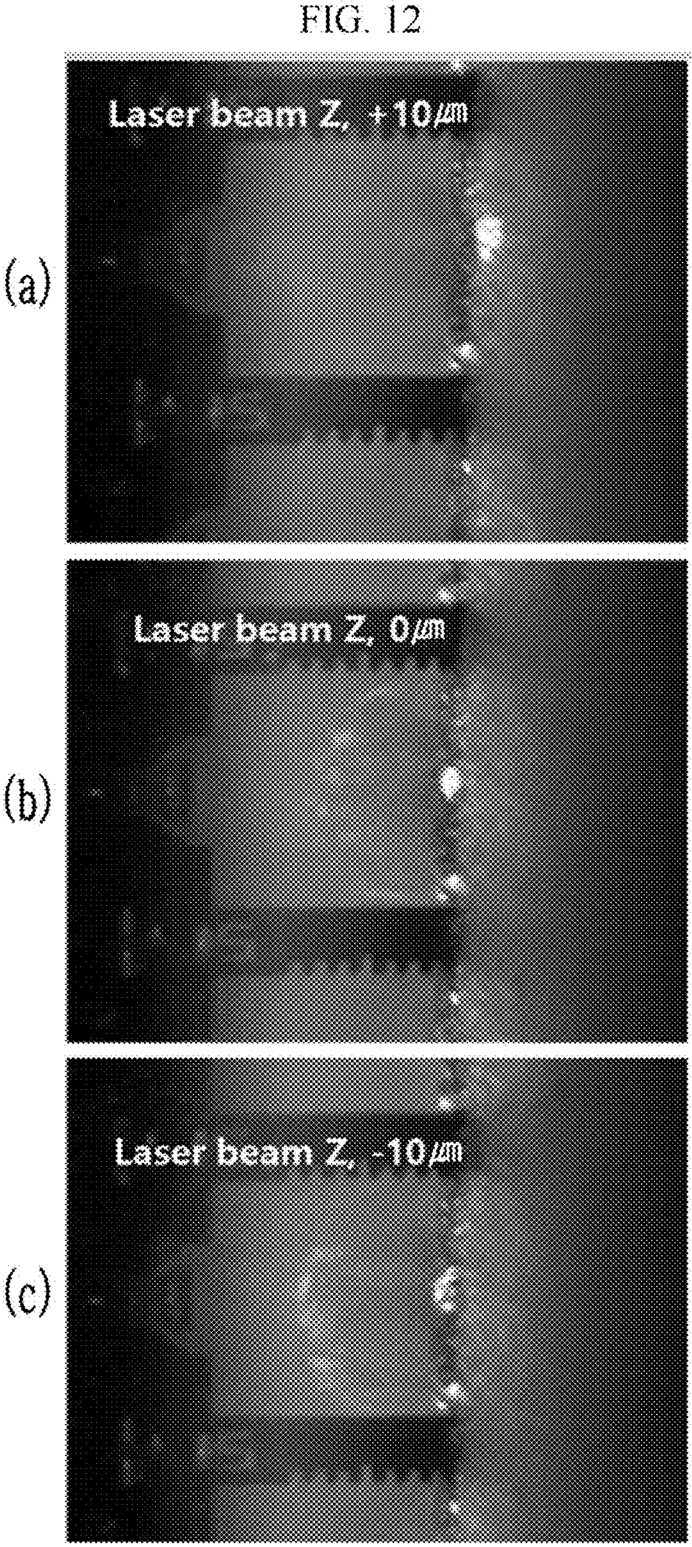
FIG. 12 shows an example of an image according to the embodiment.
Figure 13:
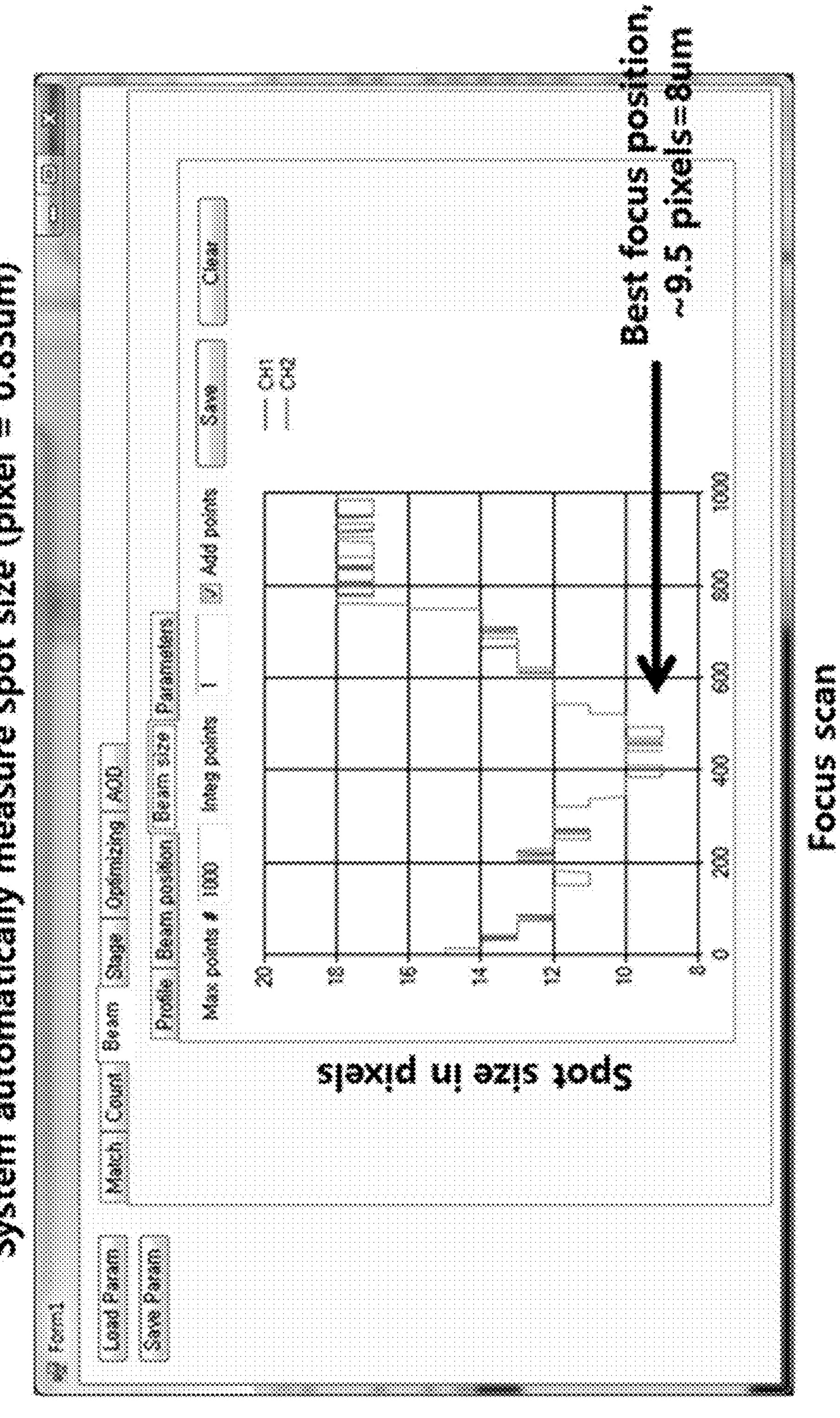
FIG. 13 shows an example of a result of the image measurer according to the embodiment.

Next, referring to FIGS. 10, 11, 12, and 13, together with FIGS. 1, 2, 3, and 4, the second operation of the beam calibrator 20 of the laser device 100 according to the embodiment will be described. FIG. 10 shows the second operation of the beam calibrator of the laser device according to the embodiment, FIG. 11 shows an example of an image according to the embodiment, FIG. 12 shows an example of an image according to the embodiment, and FIG. 13 shows an example of a result of the image measurer according to the embodiment.

The first operation of the beam calibrator 20 of the laser device 100 is to calibrate positions of the laser beam in the horizontal direction (x and y directions), and the second operation of the beam calibrator 20 of the laser device 100 is to calibrate positions of the laser beam in the vertical direction (z direction).

Referring back to FIG. 4, the laser irradiation method according to the embodiment includes a step of determining an error in the third direction (z) by using the first image E1 with the corrector 7 (S700).

At first, in the step of irradiating the laser beam (S200), the laser beam irradiated from the laser source 1 may be irradiated while constantly changing positions along the third direction (z direction) by using the laser deflector 3.

As described, the first image E1 scattered by the laser beam that is irradiated while consistently clanging positions along the third direction (z direction) is captured by the step of focusing the scattered light (S300) and the step of capturing the focused scattered light (S400).

In the step of determining the error in the third direction (z direction) (S700), the captured first image E1 is compared with image data stored in the memory 7*a* of the corrector 7, and accordingly, the error in the third direction (z direction) is calculated by the calculator 7*b* of the corrector 7.

This will be described detail with reference to FIGS. 10, 11, and 12.

Referring to FIG. 10, in the step of irradiating the laser beam (S200), the position of the laser beam irradiated while consistently changing positions along the third direction (z) will be described. As shown in FIG. 10, the laser beam may be scanned and irradiated in the upper direction Z+ and the lower direction Z− from the reference position Z0 of the second surface f2 of the process object 200.

The reference position Z0 is a position at which the process is to be performed, and may be a position that is in focus with the object lens 4.

FIG. 11 illustrates an image of image data stored in the memory 7*a* of the corrector 7. Referring to FIG. 11, in the case of the reference position Z0, a spot size of the first image E1 of the laser beam is small, and this implies that the laser beam is focused at an accurate position. In addition, in case of being deflected toward the upper direction Z+ from the reference position Z0 and deflected toward the lower direction Z− from the reference position 20, images of the laser beam have images in the shape of semicircles of which directions are opposite to each other. As described, by comparing the image data stored in the memory 7*a* of the corrector 7 with the actually measured first image E1 of the laser beam, it is possible to determine how much the laser beam is deflected along the third direction (z direction) from the reference position.

FIG. 12 illustrates an example of the laser beam (0 μm) irradiated from the reference position Z0 and the first images E1 captured at a position (+10 μm) deflected by about 10 μm in the upper direction Z+ from the reference position Z0 and captured at a position (−10 μm) deflected by about 10 μm in the lower direction Z− from the reference position Z0 by using an object lens having a numerical aperture of about 0.65. In FIG. 12, images of laser beams irradiated to an area of about 8 μm with laser power of about 10 mW and a laser impulse of about 1 MHz. This corresponds to energy density of about 0.02 J/cm$^2$.

Referring to FIG. 12, similar to the case described with reference to FIG. 11, the laser beam (0 μm) irradiated from the reference position Z0 has an image focused in the narrow area, and the laser beam deflected by about 10 μm toward the upper direction Z+ from the reference position Z0 and the laser beam deflected by about −10 μm toward the lower direction Z− from the reference position Z0 have images in the shape of semicircles whose directions are opposite to each other.

In FIG. 13, a spot size of the first image of the laser beam irradiated while scanning along the third direction (z direction) is measured. Referring to FIG. 13, the position where the spot size of first image E1 is the smallest, that is, is deflected by about 8 μm, is the position where the laser beam is the most focused, and this is the position where the actual process will be performed.

In the step of determining the error in the third direction (z direction) (S700) of the laser beam irradiation method according to the embodiment, the image data stored in the memory 7*a* of the corrector 7 and the actually measured first image E1 of the laser beam are compared to thereby calculate how much the laser beam is deflected along the third direction (z direction) from the reference position. The irradiation method of the laser beam according to the embodiment includes a step of correcting the second position of the laser beam in the third direction (z direction) (S800) by using the calculated value in the step of determining the error in the third direction (z direction) (S700).

The positions where the laser beam is irradiated in the step of correcting the first position error (S600) and the step of correcting the second error (S800) can be changed, or the position of the process object 200 can be changed. The position where the laser beam is irradiated can be changed to a desired position by using a laser scanner. For example, the laser scanner may be a galvanometer or a polygon scanner, and may include at least two mirrors.

The irradiation method of the laser beam according to the embodiment includes a step of irradiating a laser beam of a second intensity required for an actual process (S900) after correcting the position where the laser beam is irradiated to the second surface f2 of the process object 200 through the step of correcting the first position error (S600) and the step of correcting the second error (S800). The second intensity of the laser beam used in the actual laser process is about 1 J/cm$^2$ or more.

As described, according to the irradiation method of the laser beam according to the embodiment, after irradiating a laser beam of a relatively weak first intensity on the second surface f2 that is perpendicular to the first surface f1 in which the plurality of alignment marks 5 are formed among the surfaces of the process object 200, the first image E1 by the laser beam and the second image E2 of the plurality of alignment marks 5 are captured, and the step of correcting the first error (S600) is carried out in the first direction (x direction) and the second direction (y direction) and the step of correcting the second error (S800) is carried out in the third direction (z direction) by using the captured images, and then the laser beam with the second intensity, which is required for an actual process, is irradiated such that the laser beam can be irradiated at the correct position even on the side of the surface of the process object 200 where the alignment mark is not formed.

While this disclosure has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A laser device comprising:

a laser source generating a laser beam;

a laser deflector deflecting the laser beam supplied from the laser source to be irradiated to a process object which includes a first surface on which an alignment mark is disposed and a second surface connected to the first surface and extending from the first surface substantially perpendicular to the first surface, the deflected laser beam being irradiated in a direction substantially perpendicular to the second surface of the process object wherein the second surface does not include an alignment mark;

an object lens focusing scattered light of the laser beam that is scattered from the second surface of the process object;

an image capture device capturing an image of the scattered light focused by the object lens and an image of the alignment mark disposed on the first surface of the process object; and a corrector correcting a position of the laser beam by using the captured image of the scattered light focused by the object lens and the captured image of the alignment mark.

2. The laser device of claim 1, wherein the corrector includes a memory and a calculator.

3. The laser device of claim 1, wherein an area of the first surface is larger than an area of the second surface, and the plurality of alignment marks are a plurality of pixels formed in the first surface.

4. The laser device of claim 1, wherein the object lens is disposed to face the second surface of the process object.

5. The laser device of claim 4, wherein the object lens has a numerical aperture that is smaller than 1.

6. The laser device of claim 5, wherein the object lens has a numerical aperture of 0.65.

7. The laser device of claim 1, wherein the image capture device is disposed to face the first surface of the process object.

8. The laser device of claim 1, wherein the image capture device captures an image of the plurality of alignment marks.

9. A laser irradiation method comprising steps of:

generating a laser beam having a first intensity;

irradiating the laser beam to a process object which includes a first surface on which an alignment mark is disposed and a second surface connected to the first surface and extending from the first surface substantially perpendicular to the first surface, the laser beam being irradiated in a direction substantially perpendicular to the second surface of the process object to a plurality of positions by scanning the generated laser beam wherein the second surface does not include an alignment mark;

capturing a first image of scattered light of the laser beam which is scattered from the second surface of the process object and a second image of alignment marks disposed on a first surface of the process object;

calculating a position error of the laser beam by using the captured first image and the captured second image; and correcting the calculated position error.

10. The laser irradiation method of claim 9, further comprising a step of focusing the scattered light of the laser beam by using an object lens.

11. The laser irradiation method of claim 10, wherein the step of capturing first and second images captures the first image of the focused scattered light.

12. The laser irradiation method of claim 11, wherein the step of capturing first and second images captures the first image and the second image in one frame.

13. The laser irradiation method of claim 9, wherein the step of calculating the position error of the laser beam includes a first error calculation for calculating a position difference between the captured first image and second image.

14. The laser irradiation method of claim 13, wherein the first error calculation is calculating an error of the laser beam in a first direction or an error of the laser beam in a second direction which is perpendicular to the first direction.

15. The laser irradiation method of claim 13, wherein the step of calculating the position error of the laser beam further includes a second error calculation for determining a position difference by comparing the captured first image and a reference image stored in a corrector.

16. The laser irradiation method of claim 15, wherein the second error calculation is calculating an error of the laser beam in a third direction that is perpendicular to the first direction and the second direction.

17. The laser irradiation method of claim 9, wherein the step of correcting the calculated position error is accomplished by controlling a position of the laser beam.

18. The laser irradiation method of claim 17, wherein the step of controlling the position of the laser beam uses a laser scanner.

19. The laser irradiation method of claim 9, further comprising a step of supplying a laser beam having a second intensity to the process object after the correcting the calculated position error, wherein the second intensity is higher than the first intensity.

20. The laser irradiation method of claim 19, wherein the first intensity of the laser beam is 0.01 J/cm2 to 0.1 J/cm2, and the second intensity of the laser beam is 1 J/cm2 or more.

* * * * *